March 25, 1958  P. R. CONTANT ET AL  2,828,460
RELAY CONTROLLED WINDSHIELD WIPER ACTUATING MECHANISM
Filed June 18, 1956  4 Sheets-Sheet 2

INVENTORS
PETER R. CONTANT
RAYMOND H. SULLIVAN
BY
D. C. Staley
THEIR ATTORNEY

INVENTORS
PETER R. CONTANT
BY RAYMOND H. SULLIVAN

D. C. Staley
THEIR ATTORNEY

March 25, 1958     P. R. CONTANT ET AL     2,828,460
RELAY CONTROLLED WINDSHIELD WIPER ACTUATING MECHANISM
Filed June 18, 1956     4 Sheets-Sheet 4

INVENTORS
PETER R. CONTANT
RAYMOND H. SULLIVAN
BY D. C. Staley
THEIR ATTORNEY

# United States Patent Office 2,828,460
Patented Mar. 25, 1958

2,828,460

RELAY CONTROLLED WINDSHIELD WIPER ACTUATING MECHANISM

Peter R. Contant and Raymond H. Sullivan, Rochester, N. Y., assignors to General Motors Corporation, Detroit, Mich., a corporation of Delaware Application June 18, 1956, Serial No. 592,045

15 Claims. (Cl. 318—466)

This invention pertains to windshield wiper actuating mechanism, and particularly to electric motor driven, relay controlled windshield wiper actuating mechanism.

Heretofore, electric motor driven wiper actuating mechanisms having variable throw crank means for varying the amplitude of oscillation of a wiper actuating shaft, and switch means for controlling the electric motor, have been actuated by the operator through a Bowden wire. Mechanisms of this type are disclosed in copending applications Serial No. 481,767, filed January 14, 1955, in the name of John G. Hart, and Serial No. 551,800, filed December 8, 1955, in the name of Elmer E. Reese, and assigned to the assignee of this invention. The present invention contemplates the use of a relay, or electromagnet, for controlling the adjustment of the variable throw crank means, as well as the switch means. Accordingly, among our objects are the provision of a control system for electric motor driven windshield wiper actuating mechanism including electromagnetic means for controlling the operation thereof; the further provision of windshield wiper actuating mechanism having variable throw crank means and electromagnetically actuated means for controlling the throw thereof; the further provision of electric motor driven wiper actuating mechanism including electromagnetic means for actuating the motor switch; and the still further provision of continuously variable speed, electric motor driven wiper actuating mechanism including a combined rheostat and switch assembly for controlling the operation thereof.

The aforementioned and other objects are accomplished in the present invention by incorporating a remotely controlled relay, or electromagnet, in the wiper actuating mechanism. Specifically, three embodiments of the improved wiper actuating mechanism are disclosed herein. In the first embodiment, the variable throw crank assembly is of the type disclosed in the aforementioned application, Serial No. 481,767. Thus, the variable throw crank assembly includes a worm gear which is driven by an electric motor. The worm gear has an internal notch and a peripheral cam surface, the internal notch being designed to receive one end of a spring-biased drive pawl which is carried by a disc. A crank plate carrying a crank pin is connected to rotate with the worm gear and is supported on an eccentric portion of the disc. The mechanism includes a latch arm which can be moved so as to engage the drive pawl, thereby interrupting the driving connection between the disc and the worm gear. During continued rotation of the worm gear relative to the disc, the throw of the crank is increased, and when the throw of the crank is a maximum, the electric motor is deenergized and dynamically braked through a self-generative circuit to a standstill. In the present invention, an electromagnet coil having a movable armature is mounted in the switch chamber of the crank assembly housing. The armature is operatively connected to the latch arm and is spring-biased to a position where the latch arm will engage the drive pawl. The armature also includes a portion for actuating the combined parking and running switch of the wiper assembly. Energization of the electromagnet is controlled by a manually operable member which also operates a rheostat for controlling the speed of motor operation. When the manual member is moved to the "Off" or "Park" position, the electromagnet is deenergized, thereby permitting the spring to displace the armature and move the latch arm to an operative position. Energization of the motor is continued through the combined running and park switch which is latched in the running position by a leaf spring. When the amplitude of oscillation has been increased to a maximum, an arm attached to the output shaft engages and diverts the leaf spring latch, thereby permitting movement of the switch from the "Run" to the "Park" position and establishing the self-generative dynamic braking circuit.

In order to initiate wiper operation, the manual control member is moved from the "Park" position to a running position, thereby energizing the electromagnet which effects movement of the combined run and park switches to the "Run" position, and at the same time move the latch arm to an inoperative position, thereby releasing the drive pawl. Accordingly, rotation of the electric motor will automatically reestablish the driving connection between the disc assembly and the worm gear when the drive pawl reengages its notch in the worm gear. Thereafter, the speed of wiper operation can be infinitely varied by the manually operable member.

In the second embodiment, the crank assembly is identical with that of the first embodiment. However, the electromagnet operated mechanism for controlling the latch arm is modified to the extent that upon electromagnet energization, the latch arm is not disengaged from the drive pawl. Thus, in the second embodiment, the armature has a bracket attached thereto which is connected by means of a spring to a bracket attached to the latch actuating shaft. In addition, the armature is connected by a second spring to the crank housing. Upon electromagnet energization, the armature moves the combined run and park switch to the "Run" position and in so doing tensions both springs, thereby conditioning the latch arm bracket for movement to a running position when the worm gear cam disengages the latch arm from the drive pawl. Energy is stored in the second spring during electromagnet energization for moving the latch arm to an operative, or parking, position upon deenergization of the electromagnet. In the second embodiment, the electrical control system can be adapted for use with coordinated washer mechanism including means for timing the operation of the wiper actuating mechanism by means of a dashpot.

In the third embodiment, the crank assembly is of the type disclosed in the aforementioned copending application Serial No. 551,800. Accordingly, in this embodiment, the electric control circuit does not include a self-generative dynamic braking arrangement. The construction of the electromagnet, armature and the latch arm actuating mechanism is identical to that of the second embodiment.

Further objects and advantages of the present invention will be apparent from the following description, reference being had to the accompanying drawings wherein preferred embodiments of the present invention are clearly shown, similar numerals depicting similar parts throughout the several figures.

Figures 1, 2, 3:
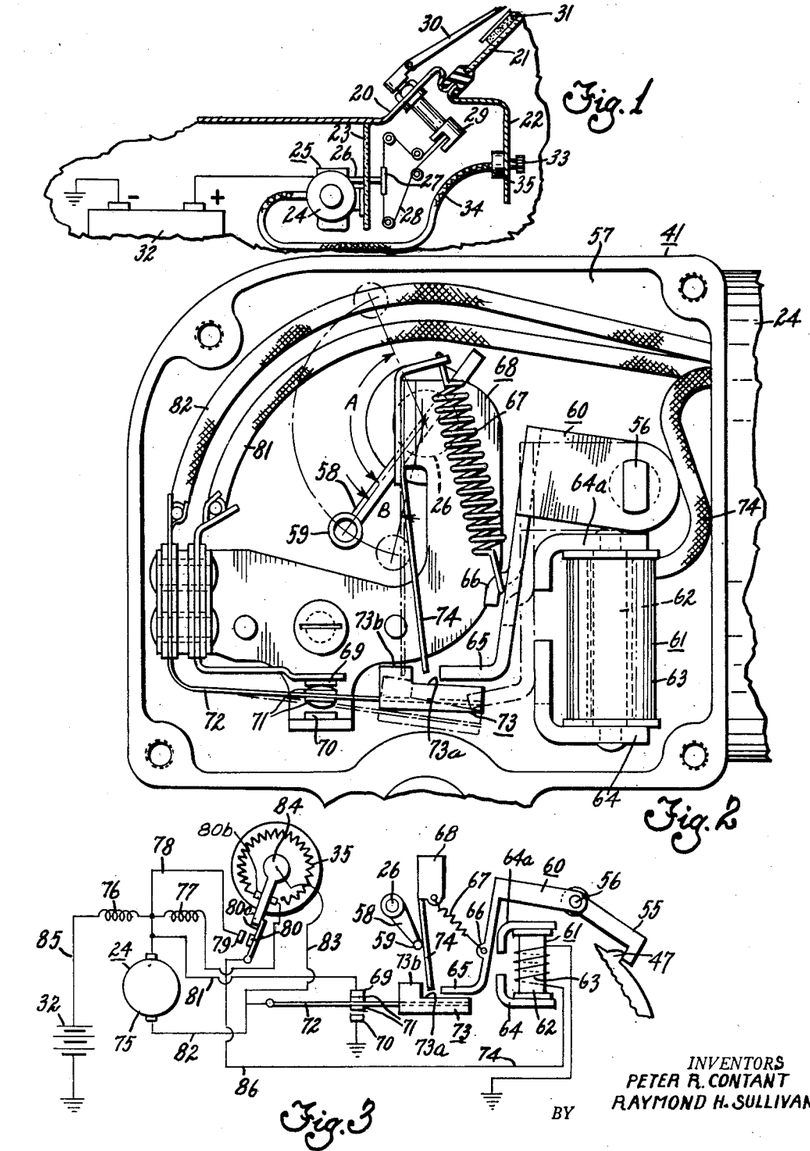
Fig. 1 is a fragmentary view, partly in section and partly in elevation, of a vehicle equipped with the relay controlled wiper actuating mechanism of this invention.
Fig. 2 is a fragmentary view, in elevation, depicting the relay and switch mechanism of the first embodiment.
Fig. 3 is a combined electrical and mechanical schematic of the first embodiment.

With particular reference to Fig. 1, a typical wiper installation in a vehicle is shown, the vehicle including a cowl 20, a windshield 21, an instrument panel 22 and a firewall 23. The windshield wiping mechanism includes an electric motor 24, which is connected to motion converting mechanism 25 that imparts oscillation to a shaft, or driven member 26. The shaft 26 extends through the firewall 23 and has attached thereto a drive pulley 27, which is connected to a flexible cable drive 28. The flexible cable drive 28 is also connected to a transmission assembly 29, which projects through the cowl 20 for driving a wiper arm 30 carrying a blade 31, which contacts the outer surface of the windshield 21. The vehicle also includes a battery 32, which constitutes a source of electric power for energizing the motor 24, energization of the motor 24 being controlled by a manual control 33 mounted on the instrument panel and connected by a cable 34, including a plurality of wires, to the motor driven actuating mechanism to be described. The manual control 33 is also associated with a rheostat 35 supported by the instrument panel 22, the purpose of which will be pointed out hereinafter.

Figure 4:
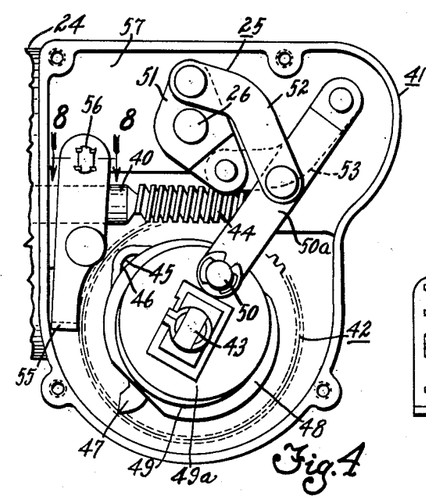
Fig. 4 is a fragmentary view, in elevation, of the crank mechanism of the first and second embodiments.

With particular reference to Figs. 2 through 4, in the first embodiment, the electric motor 24, which is a unidirectional direct current motor, includes an armature shaft 40 that extends into a housing 41 for the motion converting and switch mechanism to be described. The motion converting mechanism 25 includes a worm gear 42, which is drivingly connected to a shaft 43 rotatably supported in the housing 41. The worm gear 42 is driven by the electric motor 24 in a clockwise direction by means of a worm 44 formed as an integral part of the armature shaft 40 and engaging the worm gear. As aforementioned, the motion converting mechanism 25 in the first embodiment is of the type disclosed in application Serial No. 481,767, and, thus, the worm gear 42 is formed with an internal notch 45 and a peripheral cam surface 46. The notch 45 receives one end of a spring-biased drive pawl 47, the drive pawl 47 being carried by a disc 48. Accordingly, when the drive pawl 47 is in engagement with the notch 45 of the worm gear 42, rotation of the worm gear 42 will impart rotation to the disc 48. A crank plate 49 is connected to rotate with the worm gear 42, the crank plate 49 carrying a crank pin 50, which is radially adjustable relative to the axis of the worm gear 42 in a slot, not shown, of a yoke 49a connected to rotate with the shaft 43.

Actually, in accordance with the aforementioned application Serial No. 481,767, the crank plate 49 is supported on an eccentric portion of the disc 48 so that when the drive pawl 47 is engaged with the notch 45, the throw of the crank pin 50 is at a minimum and will remain at this minimum during rotation of the worm gear 42. The crank pin is pivotally connected to one end of a connecting rod 50a, the connecting rod also being connected to a rocker arm 51 attached to the output shaft 26 by means of a pair of cross links 52 and 53. During rotation of the disc 48 with the worm gear 42 through the drive pawl 47, oscillation of fixed amplitude will be imparted to the driven shaft 26 so as to move the wiper arm 30 and wiper blade 31 throughout a wiping stroke. The amplitude of oscillation imparted to the shaft 26 during the wiping stroke is indicated by angle A in Fig. 2.

In order to increase the amplitude of oscillation imparted to the shaft 26 so as to move the wiper blade 31 beyond its normal wiping stroke to a park position, the throw of the crank pin 50, or more particularly, the radial distance between the axis of the worm gear 42 and the center of the crank pin 50 must be increased. To accomplish this result a latch arm 55 is attached to a pivotally movable shaft 56 supported by the housing 41. When the shaft 56 is moved in a counterclockwise direction, as viewed in Fig. 4, the end of the latch 55 is moved towards the axis of the worm gear 42 so as to engage the extending end of the drive pawl 47 during rotation of the worm gear 42. When the latch arm 55 engages the end of the drive pawl 47, the driving connection between the disc 48 and the worm gear 42 in interrupted, and upon continued rotation of the worm gear 42 and the crank plate 49 about the eccentric portion of the now stationary disc 48, the crank pin 50 will move radially outward and thereby increase the amplitude of oscillation imparted to the shaft 26 throughout the angle B in Fig. 2.

With particular reference to Figs. 2 and 3, the means for controlling the latch 55 and the switch mechanism for the electric motor will be described. The shaft 26 extends through a web 57 of the housing 41 and has attached thereto an arm 58, which carries an insulated pin 59. The latch shaft 56 also extends through the web 57 and is attached to an armature 60 of a relay, or electromagnet, 61. The electromagnet 61 includes a core 62 having wound therearound a coil 63, the core being attached to pole pieces 64 and 64a which are suitably fastened to the housing 41. The armature 60 includes a depending lug 65 having an out-struck tang 66 to which one end of a coiled compression spring 67 is attached. The other end of the compression spring 67 is attached to a switch bracket 68 secured to the housing 41. The switch bracket 68 supports stationary contacts 69 and 70, as well as a movable contact 71, which is carried by a leaf spring 72. The contact 71 is adapted to engage either contact 69 or 70, and is normally biased by the leaf spring 72 into engagement with the contact 69.

One end of the leaf spring 72 is attached to the switch bracket 68 and the other end of the leaf spring 72 has attached thereto an actuator 73 of insulating material having a stepped periphery. When the coil 63 of the electromagnet 61 is energized through wire 74, the armature 60 is attracted by the core 62 and moves from the full line position of Fig. 2 to the dotted line position of Fig. 2. This counterclockwise movement of the armature 60 moves the latch arm 55 to the position of Fig. 4 and also through the lug 65 causes movement of the contact 71 out of engagement with the contact 69 and into engagement with the contact 70 through lower step 73a of the actuator 73. When the contact 71 is in engagement with the contact 70, it is latched in this position by a leaf spring 74, which engages upper step 73b of the actuator, one end of which is attached to the bracket 68 and the other end of which is arranged to engage step 73b of the actuator 73 to prevent movement of contact 71 out of engagement with contact 70 and into engagement with contact 69 upon deenergization of the electromagnet 61.

As seen in Fig. 3, the motor 24 includes an armature 75, a series field winding 76 and a shunt field winding 77. The series field winding is connected by means of a wire 85 to one terminal of the battery 32, the other terminal of which is connected to ground. The other end of the series field winding is connected to one end of the armature and to a wire 78 connected to a switch contact 79. The switch contact 79 is adapted to be engaged by a switch contact 70, which is connected by the wire 86 to the coil 63 of the electromagnet 61. One end of the shunt field winding 77 is also connected to the wire 78, the other end being connected to a conductor strip 80b attached to one end of the rheostat 35. One side of the armature 75 is connected by a wire 81 to switch contact 69. The other side of the armature 75 is connected by a wire 82 with the leaf spring 72 and the contact 71. The leaf spring 72 is also connected by a wire 83 to a rotatably mounted slider arm 84 for the rheostat 35, the slider 84 also controlling the engagement of contact 80 with contact 79. The contact 70 and the other end of the coil 63 are connected to ground.

Operation of the first embodiment is as follows. The slider 84 is connected to the manual control 33, and upon rotation of the manual control 33 so as to impart clockwise rotation of the slider 84, as viewed by Fig. 3, the contact 80 will move into engagement with contact 79. This result occurs since the contact 80 is normally biased to engage contact 79 such as by a leaf spring 80a. When contacts 79 and 80 are in engagement, power from the battery 32 will be supplied through wire 85, series field winding 76, wire 78, contacts 79 and 80, and wire 86 to the coil 63, thereby energizing the electromagnet so that the armature 60 moves in a counterclockwise direction, as seen in Fig. 3. Counterclockwise movement of the armature 60 will release the latch arm 55 from engagement with the drive pawl 47, the drive pawl being illustrated schematically in Fig. 3. Concurrently with release of the latch 55, the lug 65 will engage the actuator 73 so as to move contact 71 out of engagement with contact 69 and into engagement with contact 70. When contact 71 engages contact 70, the motor 24 will be energized since the circuit through the series field winding 76 and the armature 75 will be completed. Accordingly, rotation of the motor 24 will impart clockwise rotation to the worm gear 42 and after approximately 180° movement of the worm gear 42, the drive pawl will reengage the notch 45 whereby the throw of the crank pin 50 will be maintained at a minimum and the shaft 26 will be oscillated throughout the angle A of Fig. 2. In order to vary the speed of motor operation, the slider 84 is moved along the rheostat 35 to vary energization of the shunt field winding 77. Thus, the speed of motor operation can be continuously varied from low speed with a minimum amount of resistance being connected in series with the shunt field winding 77 to high speed with all of the resistance of rheostat 35 being connected in series with the shunt field winding 77.

To deenergize the electric motor 24 and automatically move the wiper blade 31 to the parked position, the manual control 33 is rotated so as to move contact 80 out of engagement with contact 79. When this is accomplished, the electromagnet 61 will be deenergized, thereby permitting spring 67 to move the armature 60 to the full line position of Figs. 2 and 3. However, energization of the motor 24 will be continued since the latch spring 74 is in engagement with step 73b of the actuator 73 and maintains the contact 71 in engagement with the contact 70. Since the armature 60 has moved the latch arm 55 to an operative position where it will engage the drive pawl 47, the throw of the crank pin 50 will be increased so as to increase the amplitude of oscillation imparted to the shaft 26 throughout the angle A+B. At this time, the arm 58 carrying the insulated pin 59 will engage the leaf spring latch 74 and move it out of engagement with step 73b of the actuator 73, thereby permitting the inherent resiliency of the spring 72 to move the contact 71 into engagement with the contact 69. When the contact 71 engages the contact 69, the energizing circuit for the motor is interrupted, and a self-generative dynamic braking circuit is completed around the armature 75 through contacts 69 and 71 and wires 81 and 82. The shunt field winding 77 is connected across the armature 75 through conductor strip 80b, slider 84, wire 83 and wire 82. Thus, the armature 75 is dynamically braked to a standstill with the shaft 26 and the wiper blade 31 in the parked position.

Figure 5:
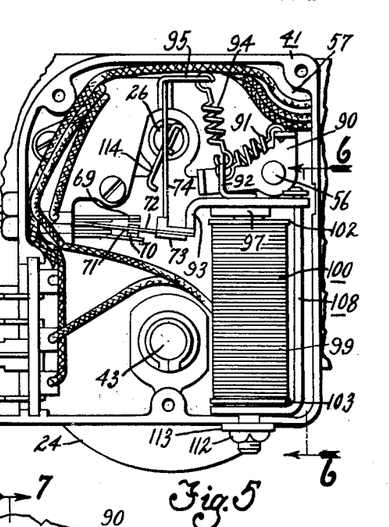
Fig. 5 is a fragmentary view, in elevation, of the relay and switch assembly of the second embodiment.
Figures 6, 8:
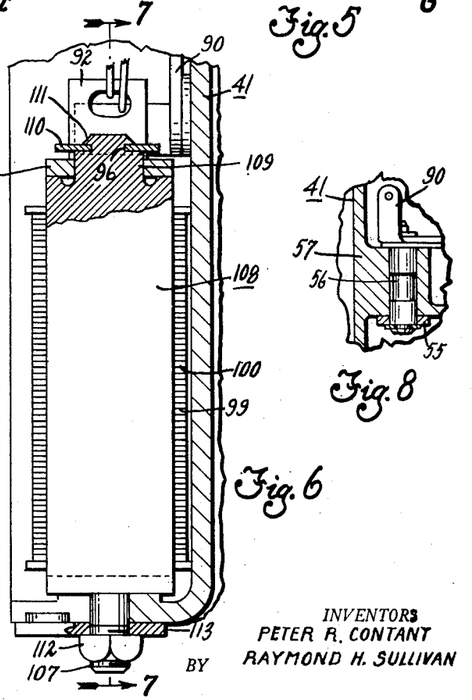
Fig. 6 is an enlarged sectional view taken along line 6—6 of Fig. 5.
Fig. 8 is a fragmentary sectional view taken along line 8—8 of Fig. 4 disclosing the latch actuator of the second embodiment.
Figure 7:
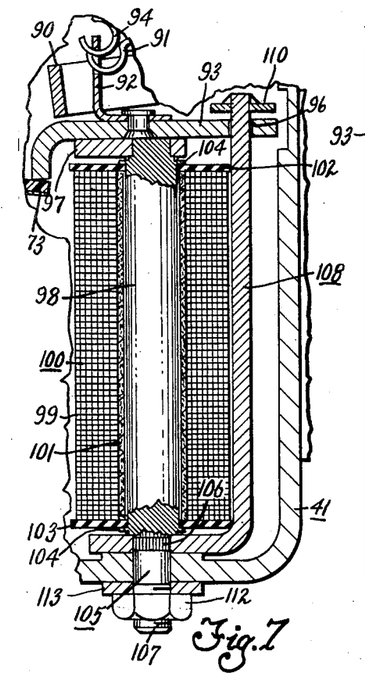
Fig. 7 is a sectional view taken along line 7—7 of Fig. 6.

With particular reference to Figs. 4 through 10, the second embodiment of this invention will be described. The motion converting mechanism employed in the second embodiment is identical to that described hereinbefore, with the exception of the mechanism for controlling the latch arm 55. Thus, as seen in Fig. 5, the latch arm shaft 56 has an L-shaped bracket 90 attached thereto. One leg of the bracket 90 is connected by a coil compression spring 91 to a bracket 92 attached to a relay armature 93. The bracket 92 is also connected by a coil compression spring 94 to a switch bracket 95 mounted in the housing 41. In this instance, the armature 93, as seen more particularly in Figs. 6 and 7, is generally of L-shape and has a rectangular aperture 96 formed therein. The armature 93 is movable into engagement with a pole piece 97 attached to a core 98 of an electromagnet 100. The electromagnet includes a winding 99 which is wound about an insulating sleeve 101 that surrounds the core 98. Insulating apertured discs 102 and 103 are retained on opposite ends of the winding 99 by staking the core 98, as indicated by numeral 104.

The core 98 is formed with an extension 105 having a serrated peripheral portion 106 and a threaded portion 107. The serrated portion 106 supports a bracket 108 having a tongue 109 extending through the aperture 96 of the armature 93 so as to pivotally support the armature. The armature 93 is retained on the bracket 108 by a washer 110 which is staked to the tongue 109 of the bracket, as indicated by 111.

In this embodiment, energization of the electromagnet 100 will cause the armature 93 to move into engagement with the pole piece 97. However, movement of the armature 93 will not effect pivotal movement of the bracket 90 but merely stresses both springs 91 and 94. Thus, in this embodiment a smaller electromagnet may be employed since the electromagnet merely conditions the latch arm 55 for movement to an inoperative position, the latch arm 55 actually being moved to an inoperative position by the peripheral cam surface 46 of the worm gear 42. After this is accomplished, the spring 91 will move the bracket 90 to the position depicted in Fig. 5. As seen in Figs. 5 through 7, the electromagnet 100 is attached to the housing 41 by means of a nut 112 which engages the threaded portion 107 of the core 98, a washer 113 being interposed between the nut 112 and the housing 41.

As seen in Fig. 8, the latch arm 55 is attached to the shaft 56 which extends through the web 57 of the housing 41, the bracket 90 being attached to the other end of the shaft 56. In the second embodiment, the driven shaft 26 has attached thereto a modified arm 114 adapted to engage the latch spring 74 when the shaft 26 is moved to the parked position. The latch spring 74 cooperates with the actuator 73 attached to the leaf spring 72 in a manner identical with that of the first embodiment. Likewise, the armature 93 cooperates with the actuator 73 to move the contact 71 out of engagement with the contact 69 and into engagement with the contact 70 upon electromagnet energization.

Figure 9:
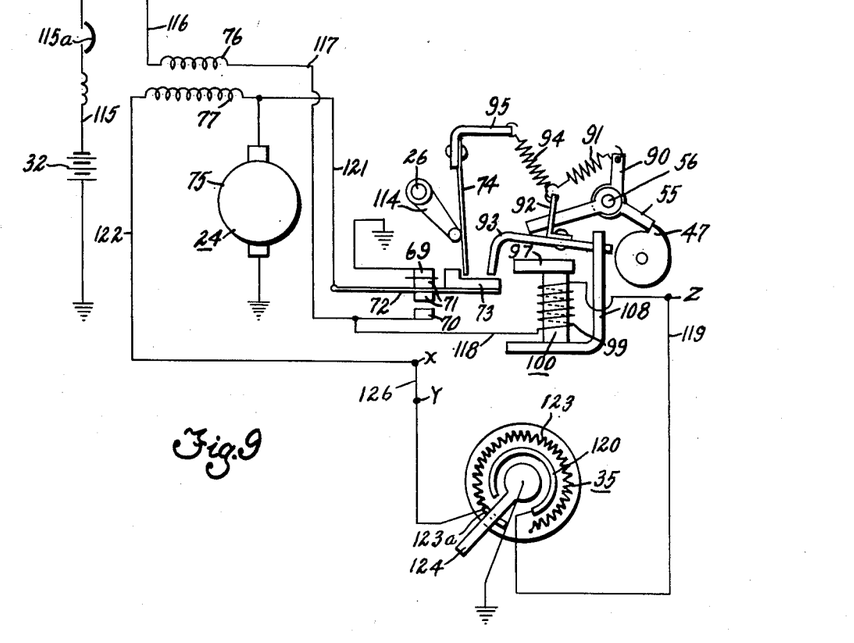
Fig. 9 is a combined electrical and mechanical schematic of the second embodiment.

With reference to Fig. 9, the battery 32 is shown connected by wire 115 through an overload switch 115a to a wire 116. The wire 116 connects to one end of the series field winding 76, the other end of which is connected by a wire 117 to the contact 70. The wire 117 is also connected by a wire 118 to one end of the coil 99, the other end of which is connected by a wire 119 to a contact 120 of the rheostat assembly 35. The contact 71 is connected to a wire 121 which connects with one end of an armature 75 and one end of the shunt field winding 77. In this instance, the other end of the armature 75 and the contact 69 are connected to ground. The other end of the shunt field winding 77 is connected by wire 122 to one end of the resistance element 123 of the rheostat assembly 35. The resistance element 123 has a conductor strip 123a connected therewith. The manual control 33 is connected to an arm or slider 124 which cooperates with the resistance element 123, the conductor strip 123a and the contact 120, the arm 124 being connected to ground. In this embodiment, only two wires, namely wires 119 and 122, are required between the manual control 33 and the electric windshield wiper motor.

Operation of the second embodiment is as follows. When the manual control 33 is manipulated so that arm 124 engages the contact 120 and the end of resistance 123, the electromagnet 100 will be energized from the battery 32 through the overload switch 115, the wire 116, the series field winding 76, the wires 117 and 118, the coil 99, the wire 119, the contact 120 and the arm 124. When relay 100 is energized, the armature 93 will move in a counterclockwise direction about the bracket 108 so as to move contact 71 into engagement with contact 70. At the same time, both springs 91 and 94 will be tensioned but the latch arm 55 will not be disengaged from the drive pawl 47. When the contact 71 engages the contact 70, the motor 24 will be energized and impart rotation to the worm gear 42. After a predetermined angular movement of the worm gear 42, the cam 46 will engage the latch arm 55 and move it to an inoperative position, thereby releasing the drive pawl 47. At this time, the bracket 90 will move in a counterclockwise direction under the urge of spring 91 to the position of Fig. 5. Thereafter, continued rotation of the worm gear 42 will result in the drive pawl 47 being reengaged with the notch 45, as more particularly described in the aforementioned application Ser. No. 481,767.

To vary the speed of motor operation, it is again only necessary to rotate the manual control 33 so as to insert varying amounts of resistance in series with the shunt field winding 77. When the manual control 33 is moved to the off position wherein the arm 124 engages conductor strip 123a as shown in Fig. 9, the relay 100 will be deenergized, thereby permitting the spring 94 to move the armature 93 in a clockwise direction about the bracket 108, this movement of the armature 93 imparting clockwise pivotal movement to the bracket 90, and the shaft 56, as viewed in Fig. 5, since the leg of the bracket 90 has been previously moved into engagement with the armature 93 by the spring 91. The latch spring 74 will maintain the contact 71 in engagement with the contact 70 so that the motor will continue to be energized. Since the latch arm 55 has been moved to an operative position, the throw of the crank pin 50 will be increased so that when the shaft 26 arrives at the parked position, the arm 114 will engage and deflect the latch spring 74 permitting the spring 72 to move the contact 71 into engagement with the contact 69. When the contact 71 engages the contact 69, a self-generative dynamic braking circuit is established for the motor 24 by reason of the armature 75 being short-circuited and the shunt field winding 77 being connected across the armature through wire 122, wire 126, conductor strip 123a and slider 124 which is connected to ground. Accordingly, the motor 24 will come to a standstill with the shaft 26 in the parked position.

Figure 10:
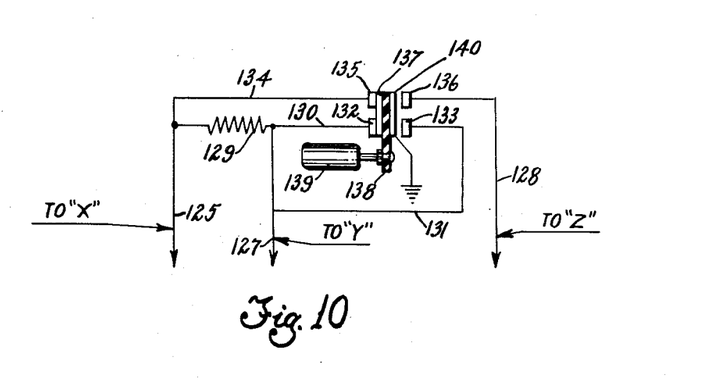
Fig. 10 is a combined electrical and mechanical schematic of the second embodiment incorporating the washer-wiper coordinating means.

With particular reference to Fig. 10, the circuit arrangement of Fig. 9 can be modified so as to be operated by windshield washer coordinating mechanism of a type presently being used on some vehicles. To accomplish this result, wire 125 is connected to point X of wire 122 and jumper 126 between points X and Y is removed. Wire 127 is connected to point Y and wire 128 is connected to point Z of wire 119. Wire 125 is connected to one end of a resistor 129, the other end of which is connected to wire 127. Wire 127 is also connected by wires 130 and 131 with switch contacts 132 and 133, respectively. Wire 125 is connected to a wire 134, which connects with switch contact 135. Wire 128 connects with switch contact 136. The contacts 132 and 135 are normally bridged by contact 137 attached to an actuator 138, which can be moved by a fluid motor 139. The actuator 138 carries a second bridging contact 140 which can be moved into engagement with contacts 133 and 136. The fluid motor 139 is controlled by any suitable means, not shown, for actuating a washer unit, not shown, so as to move the actuator 138 so that contact 140 interconnects contacts 133 and 136. When this occurs, the electromagnet 100 will be energized independently of the arm 124 from the battery 32, overload switch 115a, wire 116, series field winding 76, wires 117 and 118, coil 99, wires 119 and 128, contacts 136 and 140, contact 140 being connected to ground. Thus, the windshield wiper motor 24 will be energized and resistor 129 will be connected in series with the shunt field 76 so as to operate the motor at relatively high speed. After completion of the wash cycle, the fluid motor 139 will continue wiper operation for a timed interval after which it will move the actuator 138 so that contact 137 again bridges contacts 135 and 132, thereby deenergizing the relay 100 and causing the wiper motor to move to the park position. When the contact 137 bridges contacts 132 and 135, it should be noted that the resistor 129 is short-circuited so that the speed of motor operation can be controlled by the rheostat.

With reference to Figs. 11 through 14, the third embodiment of the present invention will be described. In this embodiment, the motion converting mechanism is of the type disclosed in the aforementioned application Serial No. 551,800 wherein the worm 44 of the armature shaft 40 engages a worm gear 140 which is supported for rotation about shaft 141. The shaft 141 is rigidly attached to the housing 41, and the worm gear 140 has an internal cam track 142 with a notch 143. The worm gear 140 has an eccentric hub 144 attached thereto by means of rivets, such as indicated by numeral 145. The eccentric hub member 144 has journaled thereon an eccentric cap member 146, which carries a drive pawl 147, one end of which is arranged to engage the notch 143 in the cam surface 142 of the worm gear. The pawl 147 is biased by means of a hairpin spring 148, opposite ends of which engage the pawl 147 and the eccentric cap 146. The eccentric cap 146 also carries a washer 151.

Figure 11:
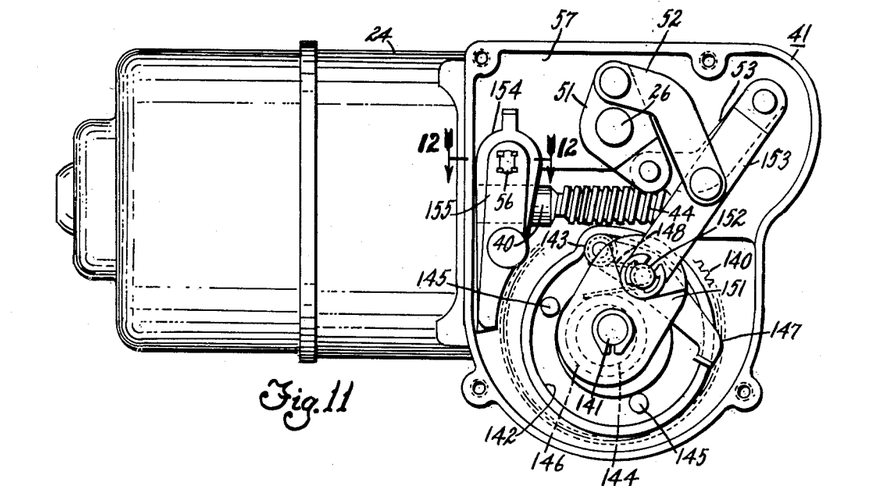
Fig. 11 is a view, in elevation, of the actuating mechanism of the third embodiment.

The eccentric cap 146 has attached thereto a crank pin 152 which is connected to one end of a connecting rod 153, the connecting rod being connected by cross links 52 and 53 to a rocker arm 51 attached to the driven shaft 26.

Figures 12, 13, 14:
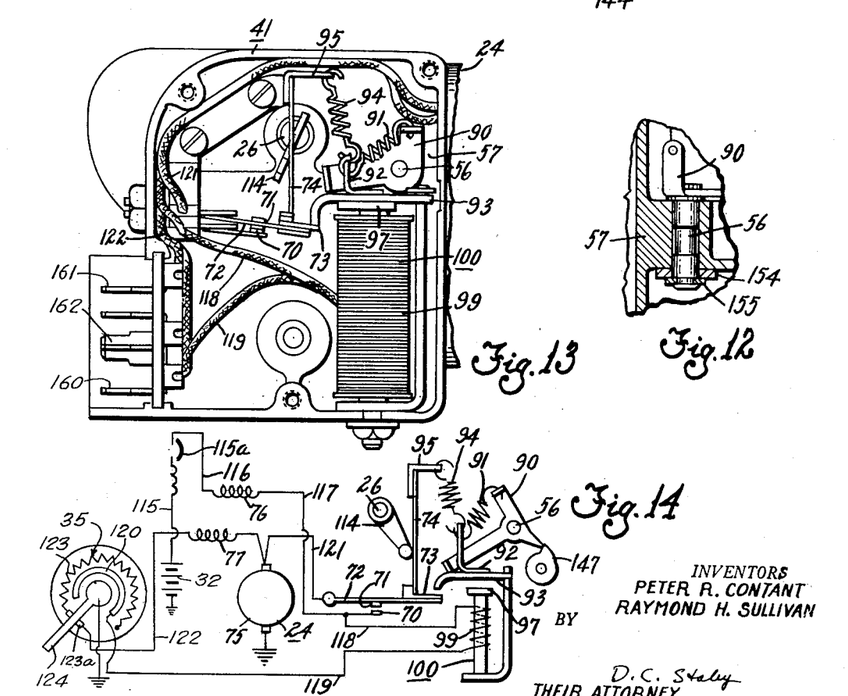
Fig. 12 is a fragmentary sectional view taken along line 12—12 of Fig. 11.
Fig. 13 is a fragmentary view, in elevation, of the relay and switch mechanism of the third embodiment.
Fig. 14 is a combined electrical and mechanical schematic of the third embodiment.

The latch mechanism for engaging the drive pawl 147 includes a stationary latch arm 154 and a movable latch arm 155 attached to shaft 56. The movable latch arm 155 is connected by shaft 56 to the bracket 90, as shown in Figs. 12 and 13. In this embodiment, the control switch only includes the contacts 70 and 71 since with the motion converting mechanism of this embodiment, the need for a dynamic braking circuit has been eliminated. The electromagnet 100 and the remaining assembly is identical to that described in conjunction with the second embodiment.

With particular reference to Figs. 13 and 14, operation of the third embodiment will be described. The overload circuit breaker 115a is connected by wire 115 to terminal 160, which is connected to the battery 32, as well as by wire 116 to one end of the series field winding 76. The other end of the series field winding is connected by wire 117 to contact 70 of the switch. One end of the shunt field winding 77 is connected by wire 122 to a terminal 161, which is subsequentially connected to the conductor strip 123a of rheostat 35, as shown in Fig. 14. The other end of the shunt field winding 77 is connected by wire 121 to switch contact 71. The wire 117 is connected to wire 118 and the solenoid coil 99, the solenoid coil also being connected by wire 119 to terminal 162. The wire 119 and the terminal 162 are connected to the conductor 120 of the rheostat assembly, as shown in Fig. 14. When the manual control 33 is actuated so that the arm 124 engages contact 120, the electromagnet 100 will be energized, thereby removing the movable latch arm 155 from engagement with the pawl 147. At the same time, switch contact 71, which is carried by a leaf spring 72 and normally biased out of engagement with contact 70, will be moved into engagement with contact 70 so as to energize the motor 24. Upon rotation of the motor, the worm gear 140 and the eccentric hub 144 will rotate relative to the eccentric cap 146. This will cause the crank pin 152 to move radially inward until the end of the drive pawl 147 is again received within the notch 143 of the cam track 142. Thereafter, continued rotation of the worm gear 140 by the electric motor will impart oscillation of fixed amplitude to the driven shaft 26. At this time, the speed of the wiper motor can be continuously varied by controlling the amount of resistance connected in series with the shunt field winding through the rheostat 35.

To interrupt wiper motor operation and park the windshield wipers, the manual control 33 is actuated to move the arm 124 out of engagement with the contact 120. This will deenergize the relay 100 and position the movable latch arm 155 so that it will be engaged by the drive pawl 147. When the drive pawl engages the latch arm 155, rotation of the eccentric cap 146 and the crank pin 152 is arrested, and during continued rotation of the worm gear 140, the crank pin is moved radially outward. When the shaft 26 arrives at the parked position, the arm 114 will deflect the latch spring 74, thereby permitting contact 71 to move out of engagement with contact 70. Accordingly, the motor will be deenergized and will coast to a standstill.

From the foregoing, it is apparent that the present invention eliminates the necessity for a Bowden wire control cable, or any other mechanical connection between the manual control and the actuating mechanism. Moreover, the switching mechanism has been greatly simplified and by using a rheostat, continuous speed variation of the electric motor can be achieved.

While the embodiments of the present invention as herein disclosed, constitute preferred forms, it is to be understood that other forms might be adopted.

What is claimed is as follows:

1. A control system for windshield wiper actuating mechanism driven by an electric motor including, a source of electric power, a motor controlling a switch movable between running and parking positions and biased to the parking position, a latch for said switch normally maintaining said switch in the running position, an oscillatable wiper actuating member operable to engage and divert said latch when it arrives at a parked position, electromagnetic means operable, when energized, to move said switch to the running position, and a second manual switch for controlling the energization of said electromagnetic means from said source of electric power.

2. A control system for windshield wiper actuating mechanism driven by an electric motor and having variable throw crank mechanism including, a source of electric power, a motor controlling switch movable between running and parking positions and biased to the parking position, a latch engageable with said switch for maintaining it in the running position, an oscillatable wiper actuating member operable to engage and divert said latch when the throw of said crank mechanism has been varied to move the member to a parked position, an element for controlling the throw of said crank mechanism and movable between running and parking positions, electromagnetic means operable, when energized, to move said switch to the running position and move said element to the running position, a second manual switch for controlling the energization of said electromagnetic means from said source of electric power, and resilient means connected with said element to move it to the parking position upon deenergization of said electromagnetic means.

3. A windshield wiper actuating mechanism of the type having a rotatable driving member, an oscillatable driven member, variable throw crank means interconnecting said driving and driven members and an element movable between running and parking positions for controlling the crank means to determine the throw thereof, the combination including, an electric motor for rotating the driving member, a source of electric power, circuit means interconnecting said source and said motor including a motor controlling switch movable between running and parking positions and biased to the running position, electromagnetic means operable, when energized, to move said switch to the running position and move said element to the running position thereby decreasing the throw of the crank means to a minimum, latch means engageable with said motor controlling switch for maintaining said switch in the running position, and a second manual switch for controlling the energization of said electromagnetic means, resilient means connected to said element for moving it to the parking position upon deenergization of said electromagnetic means thereby increasing the throw of said crank means to move said driven member to a parked position, said oscillatable driven member being operable to engage and divert said latch means when it arrives at the parked position.

4. A control system for a windshield wiper actuating mechanism driven by an electric motor including, a source of electric power, a motor controlling switch movable between running and parking positions and biased to the parking position, electromagnetic means operable, when energized, to move said switch to the running position, a latch engageable with said switch for maintaining it in the running position upon deenergization of said electromagnetic means, a member driven by said electric motor operable to engage and divert said latch when said member arrives at a predetermined position, and a second manual switch for controlling the energization of said electromagnetic means from said source of power.

5. A control system for windshield wiper actuating mechanism driven by an electric motor including, a source of electric power, a motor controlling switch movable between running and parking positions and biased to the parking position, electromagnetic means operable, when energized, to move said switch to the running position, a latch engageable with said switch for maintaining it in the running position upon deenergization of said electromagnetic means, a member driven by said electric motor operable to engage and divert said latch when said member arrives at a predetermined position, a rheostat having portions connectable in the energizing circuit of said motor for varying motor speed, a second switch for controlling the energization of said electromagnetic means from said source of electric power, and a manual control for actuating said second switch and for actuating said rheostat to control motor speed.

6. A control system for a windshield wiper actuating mechanism driven by an electric motor including, a source of electric power, a motor controlling switch movable between running and parking positions and biased to the parking position, electromagnetic means operable, when energized, to move said switch to the running position, a latch engageable with said switch for maintaining it in the running position upon deenergization of said electromagnetic means, a member driven by said electric motor operable to engage and divert said latch when said member arrives at a predetermined position, a second switch biased to the closed position for controlling the energization of said electromagnetic means from said source of electric power, and a manual control for actuating said second switch.

7. A control system for a windshield wiper actuating mechanism driven by an electric motor including, a source of electric power, a motor controlling switch movable between running and parking positions and biased to the parking position, electromagnetic means operable, when energized, to move said switch to the running position, a latch engageable with said switch for maintaining it in the running position upon deenergization of said electromagnetic means, a member driven by said electric motor operable to engage and divert said latch when said member arrives at a predetermined position, a second manual switch for controlling the energization of said electromagnetic means from said source of electric power, and a third switch for controlling the energization of said electromagnetic means from said source of electric power independently of said second switch.

8. A control system for a windshield wiper actuating mechanism driven by an electric motor including, a source of electric power, a motor controlling switch movable between running and parking positions and biased to the parking position, electromagnetic means operable, when energized, to move said switch to the running position, a latch engageable with said switch for maintaining it in the running position upon deenergization of said electromagnetic means, a member driven by said electric motor operable to engage and divert said latch when said member arrives at a predetermined position, a second manual switch for controlling the energization of said electromagnetic means from said source of electric power, a third switch for controlling the energization of said electromagnetic means from said source of power independently of said second switch, and a resistor connected in the energizing circuit of said electric motor by operation of said third switch to effect a predetermined speed of motor operation.

9. A control system for windshield wiper actuating mechanism driven by an electric motor including; a source of electric power, a motor controlling switch movable between running and parking positions including a leaf spring which is biased to the parking position, electromagnetic means operable, when energized, to engage said leaf spring and move said switch to the running position, a latch operatively engageable with said leaf spring for maintaining it in the running position, a motor operated member operable to engage and divert said latch when the member arrives at a predetermined position, said latch maintaining said switch in the running position upon deenergization of said electromagnetic means until said member arrives at said predetermined position, and a second manual switch for controlling the energization of said electromagnetic means from said source of electric power.

10. A control system for windshield wiper actuating mechanism driven by an electric motor including; a source of electric power, a motor controlling switch movable between running and parking positions including a leaf spring which is biased to the parking position, an electromagnet, an armature for said electromagnet operable upon energization of said electromagnet to operatively engage said leaf spring and move said switch to the running position, resilient means connected to said armature for moving said armature out of operative engagement with said leaf spring upon deenergiaztion of said electromagnet, a latch operatively engageable with said leaf spring upon energization of said electromagnet for maintaining said switch in the runnning position after deenergization of said electromagnet, a member driven by said motor operable to engage and divert said latch when it arrives at a predetermined position, and a second manual switch for controlling energization of said electromagnet from said source of electric power.

11. A control system for windshield wiper actuating mechanism driven by an electric motor including; a source of electric power, a motor controlling switch movable between running and parking positions including a leaf spring which is biased to the parking position, an actuator attached to said leaf spring and having a stepped periphery, electromagnetic means operable, when energized, to engage the lower step of said actuator and move said switch to the running position, a latch engageable with the upper step of said actuator when said switch is in the running position for maintaining said switch in the running position upon deenergization of said electromagnetic means, a second manual switch for controlling the energization of said electromagnetic means from said source, and a motor driven member operable to engage and divert said latch to permit movement of said motor controlling switch to the parking position when said member arrives at a predetermined position.

12. A control system for windshield wiper actuating mechanism driven by an electric motor including, a source of power, a motor controlling switch movable between running and parking positions including a leaf spring which is biased to the parking position, an actuator attached to said leaf spring having a stepped periphery, an electromagnet, an armature movable upon energization of said electromagnet and engageable with the lower step on said actuator for moving said switch to the running position, a latch engageable with the upper step of said actuator for maintaining said switch in the running position upon deenergization of said electromagnet, resilient means connected with said armature for moving the armature out of engagement with said actuator upon deenergization of said electromagnet, and a second manual switch for controlling the energization of said electromagnet from said source of electric power.

13. A windshield wiper actuating mechanism of the type having a rotatable driving member, an oscillatable driven member, variable throw crank means interconnecting said driving and driven members and an element movable between running and parking positions for controlling the crank means to determine the throw thereof, the combination including, an electric motor for rotating the driving member, a source of electric power, circuit means interconnecting said source and said motor including a motor controlling switch movable between running and parking positions and biased to the running position, an armature movable by said electromagnet upon energization thereof, said armature being connected to said element and engageable with said switch to move said element to the running position, thereby decreasing the throw of the crank means to a minimum and to move said switch to the running position, resilient means connected to said armature for moving said armature out of engagement with said switch and moving said element to the parking position upon deenergization of said electromagnet, a latch engageable with said motor controlling switch for maintaining said switch in the running position upon deenergization of said electromagnet, said oscillatable driven member being operable to engage and divert said latch when it arrives at a parked position, and a second manual switch for controlling the energization of said electromagnet.

14. A windshield wiper actuating mechanism of the type having a rotatable driving member, an oscillatable driven member, variable throw crank means interconnecting said driving and driven members and an element movable between running and parking positions for controlling the crank means to determine the throw thereof, the combination including, an electric motor for rotating the driving member, a source of electric power, circuit means interconnecting said source and said motor including a motor controlling switch movable between running and parking positions and biased to the running position, an electromagnet, an armature operable to engage said switch to move it to the running position upon energization of said electromagnet, a bracket connected to the element for controlling the throw of said crank means, first resilient means interconnecting said bracket and said armature, second resilient means connected to said armature for moving said armature out of engagement with said switch upon deenergization of said electromagnet, a latch engageable with said motor controlling switch for maintaining said switch in the running position upon deenergization of said electromagnet, said oscillatable driven member being operable to engage and divert said latch when it arrives at a parked position, and a second manual switch for controlling the energization of said electromagnet.

15. The combination set forth in claim 14 wherein said motor controlling switch includes a leaf spring, an actuator attached to said leaf spring having a stepped periphery, and wherein said armature is engageable with the lower step of said actuator and said latch engageable with the upper step of said actuator.

References Cited in the file of this patent

UNITED STATES PATENTS

| | | |
|---|---|---|
| 2,513,247 | Morton | June 27, 1950 |
| 2,732,523 | Schnepf | Jan. 24, 1956 |

FOREIGN PATENTS

| | | |
|---|---|---|
| 909,896 | Germany | Apr. 26, 1954 |